Patented Feb. 10, 1942

2,272,877

UNITED STATES PATENT OFFICE 2,272,877

GRINDING WHEEL

Samuel S. Kistler, West Boylston, Mass., assignor to Norton Company, Worcester, Mass., a corporation of Massachusetts No Drawing. Application August 2, 1941,
Serial No. 405,244

8 Claims. (Cl. 51—298)

The invention relates to grinding wheels and other abrasive bodies bonded with organic bond.

One object of the invention is to provide an improved dry snagging wheel. Another object of the invention is to provide a grinding wheel or other abrasive body which, in various embodiments, may be substituted for abrasive bodies bonded with shellac, rubber, or phenol formaldehyde, and which will remove a greater amount of metal for a given wheel wear.

Another object of the invention is to provide a resin bond for the manufacture of grinding wheels and other abrasive bodies having a chemical reaction with the work piece to increase the abrading action. Another object of the invention is to provide an ingredient for addition to an aromatic amine-aldehyde polymer which causes additional curing thereof when heated.

Another object of the invention is to improve an aniline formaldehyde polymer. Another object of the invention is to improve an aniline formaldehyde bonded grinding wheel or other abrasive body.

Another object of the invention is to get an acid to the surface of the work piece being ground without spreading it all over the work piece, thereby increasing the effectiveness of the grinding operation without etching the work piece or causing it to rust or otherwise detrimentally affecting it and without such disadvantages as spraying acid upon the operator, upon the grinding machine, or corroding the coolant pipes or coolant pump. Other objects will be in part obvious or in part pointed out hereinafter.

The invention accordingly consists in the features of construction, combinations of elements, arrangements of atoms, and in the several steps and relation and order of each of said steps to one or more of the others thereof, all as will be illustratively described herein, and the scope of the application of which will be indicated in the following claims.

I provide a quantity of abrasive grain, a quantity of a primary aromatic amine, a quantity of aldehyde, and a quantity of triamino triazine hydrohalide. I may use melamine mono-hydrohalide, melamine di-hydrohalide, or melamine tri-hydrohalide. These substances react with the polymer of the aromatic amine and aldehyde. According to the present invention, I take aniline or other aromatic amine and formaldehyde or other aldehyde and condense them in the presence of a strong acid and then I modify the condensate with the melamine hydrohalide. Preferably I first produce a polymer from the reaction of one molecular proportion of aniline with between one and three molecular proportions of formaldehyde in the presence of at least approximately one molecular proportion of an acid at least as strong as phosphoric acid. The polymer thus formed is powdered.

I now take a quantity of abrasive grains, plasticize it with furfural, for example, then add the aniline formaldehyde polymer together with a quantity of melamine hydrohalide, for example, melamine tri-hydrochloride. I preferably mix the foregoing in a mixing machine until each granule is coated with the powdered constituents, thus producing what is called a "dry" granular mix. From this mixture I mold an abrasive body, press and heat the whole to a temperature capable of causing further reaction and sufficient to fuse the aniline formaldehyde resin. I can use any temperature from 130° C. to 190° C. inclusive with satisfactory results, and very likely temperatures outside of this range will give a satisfactory product.

While the preferred aromatic amine is aniline, I may use other primary aromatic amines, such as meta-phenylene diamine, meta-toluidine, and diamino diphenyl methane. The preferred aldehyde used in my invention is formaldehyde and so far as I know this gives better results than other aldehydes. Secondly, however, I may use furfural to prepare the aromatic amine resin. A distinction must be made between a furfural aromatic amine resin, as such, and an abrasive body the abrasive grains of which were plasticized with furfural and the bond of which is modified aromatic amine formaldehyde. I find that as a practical matter to facilitate the use of the dry granular mix method of making abrasive articles and also for hot pressing, it is quite desirable to plasticize the abrasive grains with furfural. During the curing reaction furyl methylene groups attach themselves to the benzene rings of the resin, linking the rings together and increasing the strength of the resin, when furfural is added at this stage. However, within the scope of the invention the amine-aldehyde resin with abrasive grains and melamine hydrohalide may be hot pressed and furfural may be dispensed with. Also, it is practical to use other liquid plasticizers.

The invention contemplates the use of any type of abrasive grain desired, for example, fused alumina and other kinds of alumina such as emery or corundum, silicon carbide or other hard carbide, quartz, or diamonds.

Aniline,

in the presence of a strong acid, reacts with formaldehyde, HCHO, to produce a long chain polymer which, when an excess of formaldehyde above the stoichiometric proportions is used, for example, 20% excess of formaldehyde, has adjacent chains connected with methylene groups to form a tough, heat resistant, semi-thermoplastic resin.

When melamine mono-hydrochloride, which is believed to have the following structure:

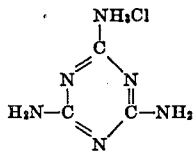

or melamine di-hydrochloride,

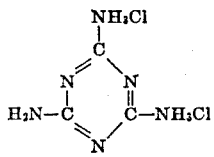

or melamine tri-hydrochloride,

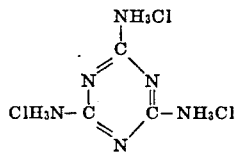

is added to the polymer formed from aniline and formaldehyde and the mixture is heated to between 130° C. and 190° C., a resin is formed which when used for the bond of a grinding wheel gives superior results. The invention has particular utility when embodied in snagging wheels the purpose of which is to clean off the fins, risers, cores and the like from rough castings and to smooth billets and the like prior to rolling. Snagging involves the removal of much metal and usually in snagging operations the desideratum is to remove metal as quickly as possible with a minimum amount of wheel wear.

It is my belief that one of the improved results in grinding with wheels made according to the present invention is due to the release of hydrogen chloride or hydrogen bromide at the grinding line from the bond, caused by the generation of heat at this line, and the reaction of the thus liberated acid halide with the metal of the work piece. It is my theory that the chips of metal clear themselves from the abrasive grains more readily when their adhesion to the abrasive grains is broken by the presence of an acid. It should be noted that the result is accomplished without the use of any liquid acid and, in fact, without any free acid excepting at the grinding line. At this point alone is the temperature high enough to liberate the acid from the molecule and cause its reaction with metal.

Considering now certain specific examples of the manufacture of grinding wheels in accordance with the present invention, I may proceed as follows:

*Example I*

Eight hundred and fifty-eight cubic centimeters of aniline is dissolved in eight liters of water containing nine and three-tenths mols of hydrochloric acid. To this is added seven hundred and fifty cubic centimeters of formalin solution containing four-tenths gram of formaldehyde per cubic centimeter. After standing for one hour, a quantity of sodium hydroxide is added equivalent to the hydrochloric acid present. The precipitated resin is filtered, washed, dried, and ground to a fine powder. Into each ten pounds of this powdered resin I mix two and two-tenths pounds of melamine tri-hydrochloride.

Twenty-eight and one-tenth pounds of a porous, relatively pure grade of fused alumina abrasive, #20 mesh grit size, is now wet with twenty-three hundredths of a pound of furfural. Five and nine-tenths pounds of the above mixture of aniline formaldehyde resin and melamine tri-hydrochloride are intimately mixed with the fused alumina wet with furfural, spread in an eighteen inch mold with a five inch arbor, and hot pressed for one hour and a half at a temperature of 160° C. under a pressure of three tons per square inch. The wheel is then stripped from the mold.

Melamine tri-hydrochloride and the other melamine hydrohalides mentioned have the property of giving off hydrogen halide when heated to a temperature of the order of 500° C. When cooled down well below that point, they no longer give up hydrogen halide.

The furyl groups connecting benzene rings are derived from furfural (the aldehyde of furfurane) which is used to wet the abrasive grains. When furfural is substituted in whole or in part for formaldehyde in the original condensation process, a furyl group will be found replacing one hydrogen atom attached to the carbon atom of some of the methylene groups connecting the amino groups to the opposite ring. In other words, the connection is through a furyl group. It will be seen that it is more advantageous to plasticize the abrasive grains with furfural because thereby a number of additional linkages are provided in the polymeric structure, making it stronger.

*Example II*

Thirty-seven pounds of #14 mesh fused alumina abrasive is placed in a mixing pan and wet with five hundred and forty cubic centimeters of furfural. To this are added nine pounds of the resin and melamine tri-hydrochloride of Example I and two pounds of cryolite. The mixture is spread in a sixteen inch mold with a six inch arbor and hot pressed for two hours at a temperature of 160° C. and under a pressure of five hundred tons. Such a wheel will give as good a finish on stainless steel as a rubber wheel, but is more durable.

It may be noted at this point that cold pressing can be resorted to by reason of the plasticizing of the abrasive with furfural. However, the results are not as satisfactory as when the hot pressing method is used. Furthermore, the addition of furfural definitely increases the plasticity and provides a better product made by the hot pressing method.

*Example III*

One thousand nine hundred and eighty grams of diamino diphenyl methane are dissolved in eight liters of water containing twenty mols of hydrochloric acid. To this solution is added eight hundred cubic centimeters of formalin solution containing four-tenths gram formaldehyde per cubic centimeter. After standing for one hour, a quantity of sodium hydroxide is added equivalent to the hydrochloric acid used. The precipitated resin is filtered, washed, dried, and ground to a fine powder.

Eight hundred and eighty-five grams of #60 mesh fused alumina is mixed dry with one hundred and sixty grams of the above powdered resin and forty-nine grams of melamine di-hydrobromide. This mixture is spread in an eight inch mold and pressed at a temperature of 175° C. under a pressure of one hundred and fifty tons for half an hour. This constitutes a grinding wheel the resin bond of which is hard, tough and heat resistant. This bond likewise during grinding liberates hydrogen bromide at the grinding line.

*Example IV*

One thousand eighty grams of metaphenylene diamine is dissolved in eight liters of water containing twenty mols of hydrochloric acid. To this solution is added six hundred cubic centimeters of formalin solution containing four-tenths gram formaldehyde per cubic centimeter. After standing for one hour, a quantity of sodium hydroxide is added equivalent to the hydrochloric acid use. The precipitated resin is filtered, washed, dried, and ground to a fine powder.

Eight hundred and eighty-five grams of #60 mesh fused alumina is mixed dry with 160 grams of the above powdered resin and forty-nine grams of melamine mono-hydrobromide. This mixture is spread in an eight inch mold and pressed at a temperature of 175° C. under a pressure of one hundred and fifty tons for half an hour. This wheel has characteristics similar to the wheels of the other examples. Hydrobromic acid is liberated at the grinding line.

*Example V*

Nine hundred and thirty grams of aniline and, two liters of water containing eleven mols of hydrochloric acid are mixed with six hundred and seventy cubic centimeters of furfural and heated to 80° C. overnight. The solid mix resulting is ground and suspended in water containing sodium hydroxide equivalent to the hydrochloric acid used. After neutralization is complete, the powder is filtered, washed and dried.

Eight hundred and eighty-five grams of #60 mesh fused alumina is first wet with thirty cubic centimeters of furfural. Then one hundred and sixty grams of the above powdered resin and twenty grams of melamine di-hydrochloride are added. The whole is thoroughly mixed to cause each abrasive grain to be coated with the powder. This "dry granular mix" is spread in an eight inch mold and pressed under a pressure of two hundred tons. It is then stripped from the mold and the "green" wheel is baked in an autoclave under a pressure of seven atmospheres at a temperature gradually rising to 175° C. and maintained at this temperature for three hours.

*Example VI*

Ten hundred and seventy grams of meta toluidine are dissolved in eight liters of water containing ten and two-tenths mols of phosphoric acid. To this solution is added seven hundred and fifty cubic centimeters of formaldehyde solution containing four-tenths of a gram of formaldehyde per cubic centimeter. After standing for one hour, a quantity of sodium hydroxide is added equivalent to the phosphoric acid used. The precipitated resin is filtered, washed, dried and ground to a fine powder.

Eight hundred and eighty-five grams of #60 mesh fused alumina is first wet with thirty cubic centimeters of powdered resin and twenty grams of melamine di-hydrochloride are added and mixed to produce a dry granular mix. This mixture is spread in an eight inch mold and pressed under a pressure of two hundred tons at a temperature of 150° C. for one hour. It is then cooled and stripped from the mold, and is found to be a grinding wheel of superior quality.

For the acid used in condensing the resin, besides hydrochloric and phosphoric, the following acids may also be used:

Hydriodic acid
Tri-chloro acetic acid
Di-chloro acetic acid
Maleic acid
Oxalic acid
Picric acid
Sulphuric acid The requirement is that the acid should be at least as strong as phosphoric acid to give the best results.

Every example of the invention constitutes abrasive grains bonded with a halogenated primary amine-aldehyde resin. The halogen is derived from the melamine hydrohalide including the chlorides and the bromides. While I have mentioned specific curing temperatures, it should be understood that any temperature between 130° and 190° C. may be used for curing any of the resins with the melamine hydrohalide.

It will thus be seen that there has been provided by this invention a composition of matter, an article of manufacture, and an art in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:

1. An abrasive body comprising abrasive grains bonded with the condensation product of one molecular proportion of primary aromatic amine and between one and three molecular proportions of aldehyde selected from the group consisting of formaldehyde and furfural condensed in the presence of at least approximately one molecular proportion of acid at least as strong as phosphoric acid and reacted by heating at resin curing temperatures with a melamine hydrohalide.

2. An abrasive body comprising abrasive grains bonded with the condensation product of one molecular proportion of aniline and between one and three molecular proportions of aldehyde selected from the group consisting of formaldehyde and furfural, condensed in the presence of at least approximately one molecular proportion of acid at least as strong as phosphoric acid, and reacted by heating at resin curing temperatures with a melamine hydrohalide.

3. An abrasive body comprising abrasive grains bonded with the condensation product of one molecular proportion of primary aromatic amine and between one and three molecular proportions of formaldehyde, condensed in the presence of at least approximately one molecular proportion of acid at least as strong as phosphoric acid and reacted by heating at resin curing temperatures with a melamine hydrohalide.

4. An abrasive body comprising abrasive grains bonded with the condensation product of one molecular proportion of aniline and between one and three molecular proportions of aldehyde consisting at least in part of formaldehyde, condensed in the presence of at least approximately one molecular proportion of acid at least as strong as phosphoric acid, and reacted by heating at resin curing temperatures with a melamine hydrohalide.

5. An abrasive body according to claim 1 in which furyl methylene groups connect some of the benzene rings of the resin polymer ortho to the amino groups thereof.

6. An abrasive body according to claim 2 in which furyl methylene groups connect some of the benzene rings of the resin polymers ortho to the amino groups thereof.

7. An abrasive body according to claim 3 in which furyl methylene groups connect some of the benzene rings of the resin polymer ortho to the amino groups thereof.

8. An abrasive body according to claim 4 in which furyl methylene groups connect some of the benzene rings of the resin polymer ortho to the amino groups thereof.

SAMUEL S. KISTLER.